United States Patent [19]

Foster

[11] Patent Number: 5,746,245

[45] Date of Patent: May 5, 1998

[54] METERS

[75] Inventor: Stephen Leslie Foster, Mellor, England

[73] Assignee: Siemens Measurements Limited, Oldham, United Kingdom

[21] Appl. No.: 778,193

[22] Filed: Jan. 2, 1997

[30] Foreign Application Priority Data

Jan. 4, 1996 [GB] United Kingdom ............... 9600111

[51] Int. Cl.$^6$ ............................................ F16K 31/12
[52] U.S. Cl. ............................ 137/505.35; 137/505.13;
  137/505.18; 137/505.3; 137/510; 251/30.05
[58] Field of Search ................... 137/505.13, 505.18,
  137/510, 505.34, 505.29, 505.35, 505.36,
  505.3; 251/30.05, 30.01

[56] References Cited

U.S. PATENT DOCUMENTS

| 693,170 | 2/1902 | Smith | 137/505.34 |
|---|---|---|---|
| 2,162,779 | 6/1939 | Leutwiler et al. | 137/505.35 |
| 3,139,900 | 7/1964 | Karing | 137/505.18 |
| 3,207,468 | 9/1965 | Lauducci et al. | 251/30.05 |
| 3,392,749 | 7/1968 | Gneiding et al. | 137/505.18 |
| 3,433,262 | 3/1969 | Ray | 137/505.18 |
| 3,989,060 | 11/1976 | Hughes | 137/484.2 |
| 4,016,905 | 4/1977 | Marlatt, Sr. | 137/505.41 |
| 4,682,756 | 7/1987 | Hartwit et al. | 251/30.05 |
| 4,961,441 | 10/1990 | Salter | 137/487.5 |
| 5,109,692 | 5/1992 | Fitzgerald | 137/487.5 |

FOREIGN PATENT DOCUMENTS

| 1047494 | 12/1953 | France. |
|---|---|---|
| 1264276 | 5/1961 | France. |
| 0076767A1 | 4/1983 | France. |
| 1629874 | 1/1971 | Germany. |
| 2284687 | 6/1995 | United Kingdom. |

Primary Examiner—Denise L. Ferensic
Assistant Examiner—Joanne Y. Kim
Attorney, Agent, or Firm—Evenson, McKeown, Edwards & Lenahan, PLLC

[57] ABSTRACT

The meter 2, e.g. a gas meter includes an inlet boss 4 providing an unregulated supply of gas via a valve means 8 which regulates the flow of gas as it passes into a chamber 6. The valve means 8 forms part of a governor which is formed integral with the gas meter. The valve means 8 includes a valve stem 12 which has a bore 18 extending throughout the length of the valve stem. The valve stem passes through the chamber 6 and through a first diaphragm 22 to which it is sealably connected and is terminated on the surface of second diaphragm 34. The first diaphragm 22 separates second and third chambers 24, 28, the second chamber 24 being in communication with the first chamber 6. The third chamber 28 is connected via the bore 18 in the valve stem 12 to the unregulated gas supply. The second diaphragm 34 separates fourth and fifth chambers 32, 38, the chamber 38 is vented to the atmosphere. In normal operation the chamber 32 is connected by a control valve 46 to the chamber 6, and the various balance of forces through the governor allow the gas supply to be regulated. The control valve 46 when operated by a solenoid 48 into a second position causes the chamber 32 to be connected to the chamber 28 and the inlet pressure is communicated via the conduit 54, 50 to the chamber 32 causing the governor to shut off the gas supply.

9 Claims, 1 Drawing Sheet

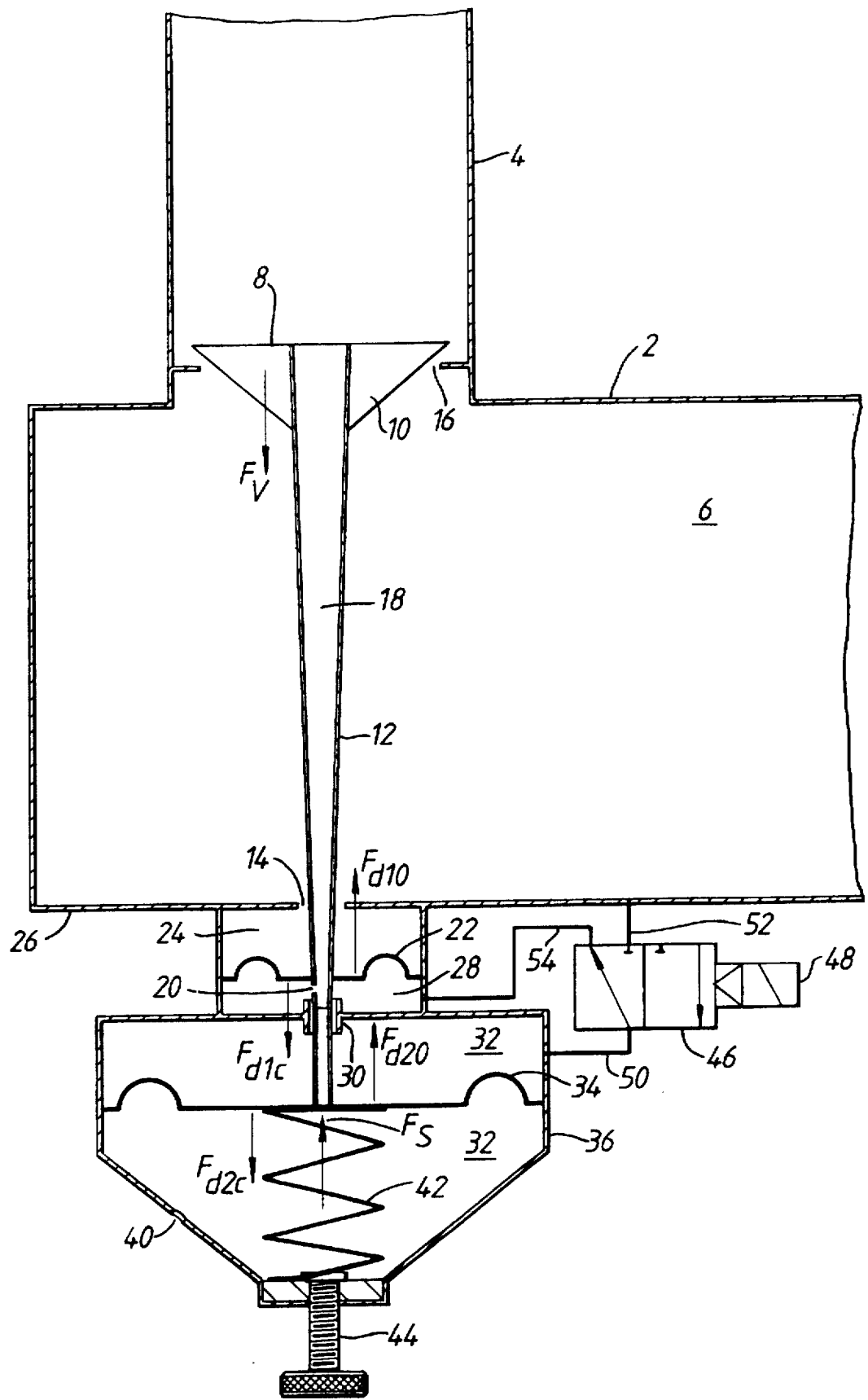

METERS

The present invention relates to meters and in particular to a gas meter having a governor which is used to control the flow of gas through the meter.

The invention finds application in conventional gas meters, or gas meters which may be controlled electronically.

In known metered gas supply systems, a gas supply has been hitherto governed by a governor which is situated external to the gas meter.

An aim of the present invention is to provide a gas meter in which the governor is integral with the gas meter and is also used to control the shut off of the supply of gas to the meter.

According to the present invention there is provided a meter including inlet means providing an unregulated supply of a commodity such as gas, and a first chamber connected to said inlet means for receiving gas via a governor for regulating the flow of gas, the flow of gas into said chamber being controlled by valve means which forms part of said governor which is formed integrally with said gas meter.

The valve means includes a valve stem which extends from a head of said valve through said first chamber and passes through and is sealably connected to a first diaphragm, and at an end thereof remote from said valve head the valve stem is connected to a second diaphragm.

A first diaphragm separates a second and third chamber, the second chamber being in communication with said first chamber and said third chamber being in communication with said unregulated gas supply via a bore which extends substantially throughout the length of said valve stem.

A second diaphragm separates a fourth and fifth chamber, the fourth chamber being vented to atmosphere.

An embodiment of the present invention will now be described with reference to the accompanying drawings in which, FIG. 1 shows a conceptual diagram of part of a gas meter including a governor.

Referring to FIG. 1 part of a gas meter 2 is shown. The gas meter 2 includes an inlet boss 4 for receiving an unregulated supply of gas. The meter contains a chamber 6 in which a regulated volume of gas is contained for subsequent supply to the consumer. The flow of gas from the inlet boss 4 to the chamber 6 is controlled by a governor.

The governor comprises a valve 8 which includes a valve head 10 and a valve stem 12. The valve stem extends through the chamber 6 via an opening 14. The valve head 10 is suitably shaped so that in operation it can move from the valve seat 16 to provide an opening through which the unregulated gas supply can pass into the chamber 6. It will be appreciated that the amount by which the valve is open determines the regulation of the gas supply. The valve stem has a bore 18 throughout its length, and at an end remote from the valve head 10 has an opening 20 through which the unregulated gas supply can vent.

The valve stem 12 after passing through the opening 14 extends into a system of diaphragms external to the chamber 6. A first diaphragm 22 sealably surrounds the opening 14 so that the regulated gas can pass into a chamber 24 created by the diaphragm 22 and the external surface of the chamber 6. The valve stem passes through the diaphragm 22 into a chamber 28 and then via a low friction seal and valve guide 30 into a chamber 32. The valve stem 12 is sealably attached to the diaphragm 22. The valve stem 12 is connected at an end thereof opposite to the valve head 10 to a second larger diaphragm 34. The diaphragm 34 is contained within a housing 36 which defines the chamber 32 and a further chamber 38. The chamber 38 is vented to the atmosphere via an orifice 40. The diaphragm 34 is biased by a spring 42 which is connected to the diaphragm and extends across the chamber 38 to the base of the housing 36. The spring 42 is tensioned by a thumb screw 44 which extends through the base of the housing 36 and is connected to the spring 42.

The orifice 20 located within the valve stem 12 allows the unregulated gas supply to enter the chamber 28.

A control valve 46 is controlled by a solenoid 48 and in its normal operating state connects the regulated gas in chamber 6 to the chamber 32 via conduits 50, 52. In its alternative operating state, the chamber 32 is connected to the chamber 28 via conduits 50, 54.

The operation of the governor will now be described. Under normal operation the control valve 46 is operated by the solenoid 48 to connect the regulated gas in chamber 6 to the chamber 32 via the conduits 50, 52.

When the meter is installed the governor is adjusted in the same way as a normal stand alone governor, to provide the correct downstream pressure by altering the pressure applied by the spring 42 and hence to the diaphragms 34, 22, by using the adjusting screw 44.

In the following description the balance of forces is as follows:

$$F_v + F_{d1c} + F_{d2c} = F_s + F_{d2o} + F_{d1o},$$

where:

$F_v$ is the inlet pressure acting on the face of the valve head 10.

$F_{d1c}$ is the outlet pressure acting upon the surface of the small diaphragm 22 facing the valve head 10.

$F_{d2c}$ is the outlet pressure acting upon the surface of the large diaphragm 34 facing the valve head 10.

$F_s$ is the biasing force exerted by the adjustable spring 42, in an opposite direction of force $F_{d2c}$.

$F_{d1o}$ is the inlet pressure acting on the small diaphragm 22 in a direction opposite to force $F_{d1c}$.

$F_{d2o}$ is the atmospheric pressure acting on the large diaphragm 34, in a direction opposite to force $F_{d1c}$.

With the above balance of forces taking effect and with the control valve 46 in the position whereby conduits 50, 52 are connected, the governor causes the valve 8 to be open permitting the required amount of gas to flow from the inlet boss 4 into the chamber 6 thereby regulating the flow of gas. When the inlet pressure of the gas supply varies, the unregulated gas flowing through the valve stem 12 via the bore 18 passes into the chamber 28 thereby altering the pressure in that chamber and causing the diaphragm 22 to flex accordingly. This causes a volume of gas in chamber 24 to pass into the chamber 6, which in turn causes a flow of gas via the conduit 52, 50 into the chamber 32. The pressure of the volume of gas in chamber 32 therefore varies accordingly. This causes the diaphragm 34 to flex and because the valve stem 12 is connected to the diaphragm 34 the valve head 10 is caused to rise or fall accordingly thereby regulating the flow of gas and returning the governor to a state where the balance of forces are equalised. In this manner, the design of the governor is such that any variation in the inlet pressure will alter the valve opening to govern the outlet pressure.

The governor can also be used to cut off the supply of gas to a consumer. This is effected by the valve 46 being operated by the solenoid 48 so that the conduit 50 is connected to the conduit 54. This effectively connects the chamber 32 with the chamber 28. In this mode of operation, the force of equilibrium is upset by increasing the force $F_{d2o}$ by using the inlet pressure instead of the outlet pressure. This results in an overriding force acting to shut the valve 8 thereby preventing the flow of gas into the chamber 6.

With the above balance of forces in operation, if the inlet pressure varies above a normal range of (up to 350 mbar), the governor will close down the supply due to the excessive inlet pressure upsetting those forces of equilibrium.

It will be appreciated by those skilled in the art that various mechanical alternatives may be used in the construction of the governor which fall within the scope of the claimed invention.

I claim:

1. A meter comprising:

inlet means for providing an unregulated supply of gas, a first chamber within said meter connected to said inlet means for receiving the gas, a governor for regulating a flow of gas received by the first chamber, and valve means for controlling the flow of gas into said first chamber, the valve means forming part of said governor which is formed integrally with said gas meter, said valve means including means for communicating said unregulated gas supply through said valve means and to said governor.

2. A meter as claimed in claim 1, wherein said valve means includes a valve stem which extends from a head of said valve through said first chamber and passes through and is sealably connected to a first diaphragm, and at an end thereof remote from said valve head the valve stem is connected to a second diaphragm.

3. A meter as claimed in claim 2, wherein the first diaphragm separates a second and third chamber, the second chamber being in communication with said first chamber and said third chamber being in communication with said unregulated gas supply via a bore which extends substantially throughout the length of said valve stem.

4. A meter as claimed in claim 3, wherein the second diaphragm separates a fourth and fifth chamber, the fifth chamber being vented to atmosphere.

5. A meter as claimed in claim 4, wherein the second diaphragm is subjected to a biasing force applied in a direction toward said valve head.

6. A meter as claimed in claim 5, wherein said first and fourth chambers are connected via a conduit path for normal operation and said biasing force is adjusted such that a balance of forces is effected as follows:

$$F_v + F_{d1c} + F_{d2c} = F_s + F_{d2o} + F_{d1o}$$

where $F_v$ is inlet pressure acting upon a face of said valve head, $F_{d1c}$ is outlet pressure acting upon a surface of the first diaphragm facing said valve head, $F_{d2c}$ is outlet pressure acting upon a surface of said second diaphragm facing said valve head, $F_s$ is the biasing force acting upon said second diaphragm in a direction opposite to force $F_{d2c}$, $F_{d1o}$ is inlet pressure acting on said first diaphragm in a direction opposite to force $F_{d1c}$, and $F_{d2o}$ is atmospheric pressure acting on said second diaphragm in a direction opposite to force $F_{d1c}$.

7. A meter as claimed in claim 6, wherein flow of gas through the conduit path is controlled by a control valve operated by a solenoid, said valve when in a first position causes said first and fourth chambers to be connected, and in a second position causes said third and fourth chambers to be connected, thereby allowing the inlet pressure to act upon said second diaphragm causing said valve means in said inlet means to shut off the gas supply.

8. A meter as claimed in claim 6, wherein the balance of forces is such that if the inlet pressure exceeds a predetermined limit the valve means in said inlet means will operate to shut off the gas supply.

9. A meter as claimed in claim 7, wherein the balance of forces is such that if the inlet pressure exceeds a predetermined limit the valve means in said inlet means will operate to shut off the gas supply.

* * * * *